UNITED STATES PATENT OFFICE.

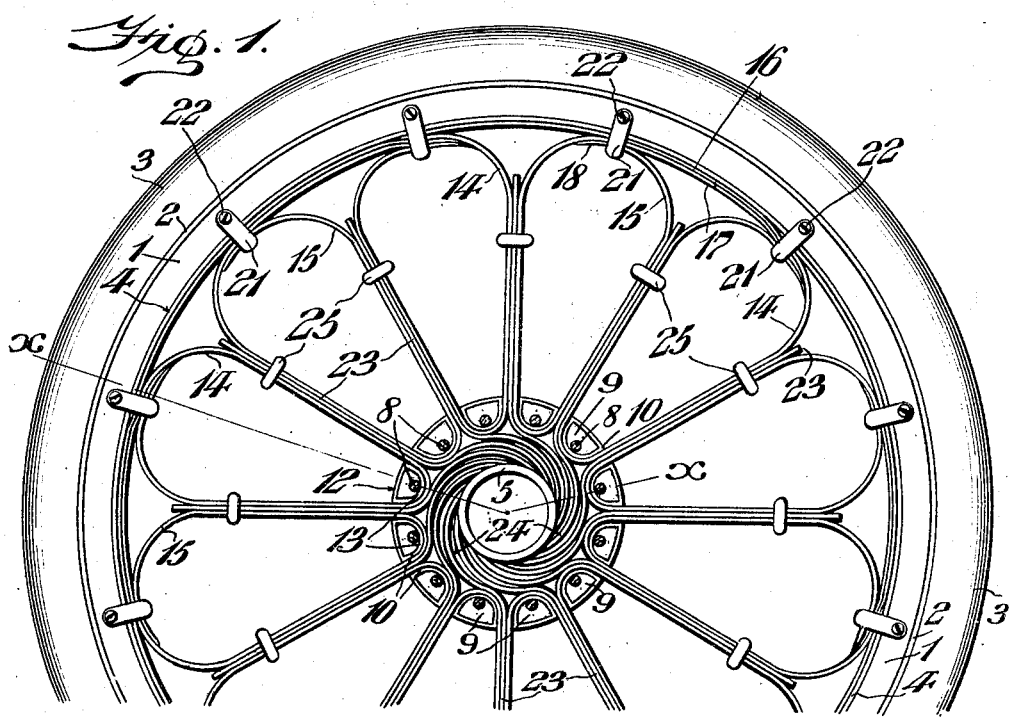

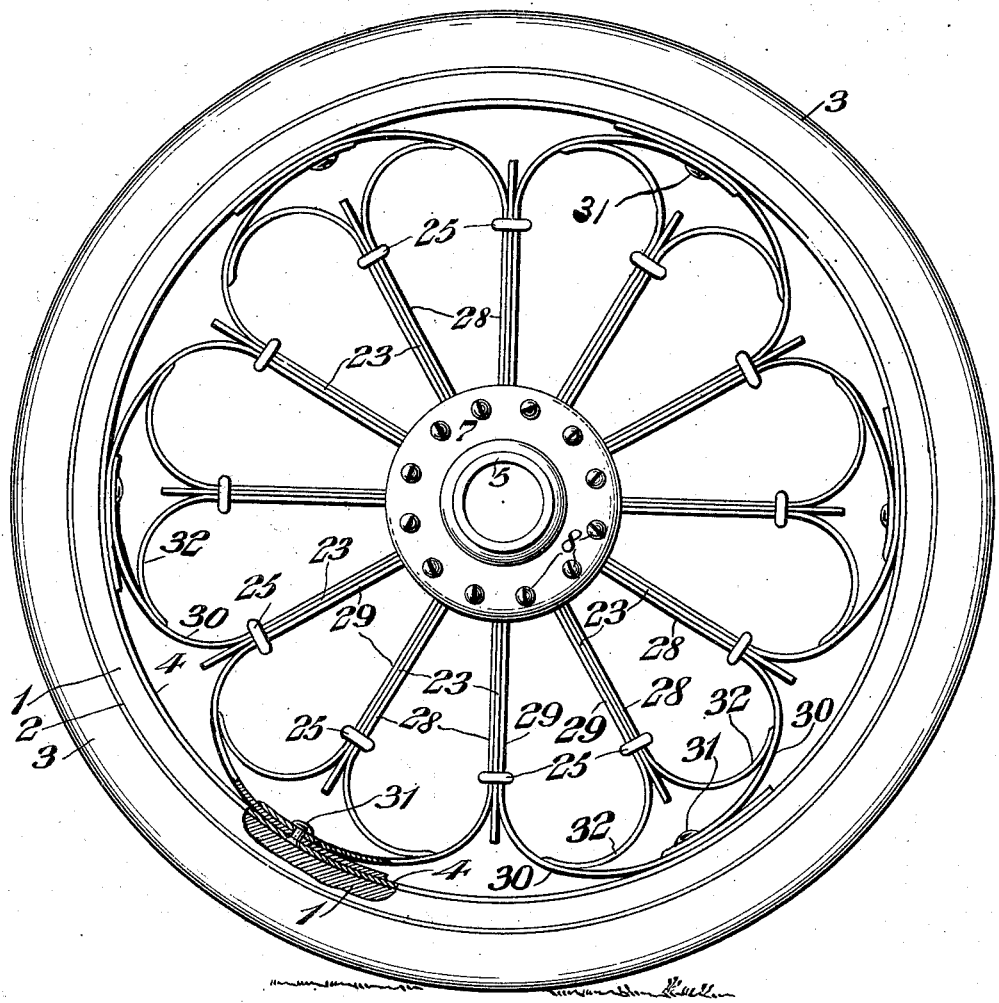

CHARLES L. SCHWARZ, OF PHILADELPHIA, PENNSYLVANIA.

RESILIENT WHEEL.

1,030,924.

Specification of Letters Patent. Patented July 2, 1912.

Application filed April 10, 1911. Serial No. 619,936.

*To all whom it may concern:*

Be it known that I, CHARLES L. SCHWARZ, a citizen of the United States, residing in the city and county of Philadelphia, State of Pennsylvania, have invented a new and useful Resilient Wheel, of which the following is a specification.

This invention relates to vehicle wheels and more particularly to the spring type of wheel whereby the use of pneumatic tires, cushion tires or the like in connection therewith is dispensed with and in consequence the trouble incident to punctures, blow outs and other tire difficulties is eliminated.

It has for an object to provide a wheel in which the spokes are formed of a novel construction of spring material so connected with the rim and axle as to distribute the compressive force and produce a resilient action effective for the desired purpose.

It further consists of other novel features of construction all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a portion of a wheel embodying my invention. Fig. 2 represents a section on line x—x Fig. 1. Fig. 3 represents a perspective view of one of the spring spoke members. Fig. 4 represents a perspective view of another member of the spoke construction. Fig. 5 represents a perspective view of one of the hub members. Fig. 6 represents a side elevation of a modified form of wheel embodying my invention. Fig. 7 represents a portion of the spoke construction showing the same in detail.

Similar numerals of reference indicate corresponding parts in the figures.

Referring to the drawings:—1 designates the rim of my novel vehicle wheel, the same, in the present instance, being preferably of wood and having secured thereto a metal band 2 adapted to receive and hold the resilient tire 3 of suitable material.

4 designates a band suitably secured to the inner side of the rim 1 to serve as a reinforcing and strengthening means therefor and contacting with which are the spring members forming the spoke structure of the wheel.

5 designates the hub of the wheel provided preferably with an outwardly extending flange 6 which forms one side of a spoke seat of which the other side is formed by an annular plate 7 secured in position as here shown by suitable bolts 8 or like fastening devices. The flange 6 and plate 7 are spaced apart to receive a block 9 preferably of wood and having a metal binding 10 therearound for strengthening purposes and provided with an opening 11 for the fastening bolts 8, as will be apparent. The block 9 and binding 10 are preferably substantially triangular in form having an outwardly curved face portion 12 and curved apex 13 for coöperation with the spoke structure, it being understood that the blocks 9 are positioned at suitable intervals around the hub 5 and serve as bearings or retaining means for the spoke structure now to be described.

The spoke structure consists, in the present instance of pairs of spring members 14 and 15 preferably of spring material and preferably of similar conformation, except as here shown the extension 16 of the member 14 is longer than the corresponding extension 17 of the member 15 though this may not be necessary in every instance. These spoke members comprise a band of metal one end 18 of which is positioned adjacent the rim while the body of the band is bent inwardly on a substantial curve to a substantially straight side portion 19 passing around the curved apex 13 of one of the retaining blocks 9 and continuing again in straight side 20 diverging from the hub 5 to a point adjacent the rim where it curves over the end 18 and passes along the rim preferably in contact with the metal band 4 to a point adjacent the next spoke member 14. The member 15 is similarly shaped but the end 18 thereof curves in a reverse direction from the end of the member 14 so that the extension 17 passes along the rim on the inside of the extension 16 of the spoke member 14 and terminates at the adjacent spoke member 14 as shown in Fig. 7, the two spring members being thus positioned substantially back to back and with their extended arms 16 and 17 passing in opposite directions along the rim one overlapping the other and being prolonged to pass to and be secured to the next pair of spoke members. It will be noted that the sides 19 and 20 of the spoke members are outwardly diverged from the retaining blocks 9 thereby providing a comparatively large rounded end adjacent the rim, the purpose of which is to afford a broad resilient contact surface for distributing the pressure.

21 designates clips preferably U-shaped and having a bolt 22 passing through the ends thereof and also through the rim 1 whereby the spoke parts are securely held together and in contact with the rim. It will of course be understood that a plurality of these clips 21 are necessary and are spaced at suitable intervals about the rim with respect to the point of tangency of the outer curved ends of the spoke members.

23 designates a spring arm or member preferably having a curved end 24 adapted to conform to the curvature of the hub 5 around which it extends a sufficient distance to grip the same and position the arm correctly with relation to the spoke. An arm 23 is located between pairs of spoke members 14 and 15 and the parts are joined together by means of clips 25. In order to retain the clips in binding position the arms 23 are each provided with recesses 26 in each side formed by the lugs 27 and in which recesses the clips 25 are seated. It will thus be apparent that each arm 23 connects a pair of spoke members with the hub and since the end of each arm terminates within the other an auxiliary resilient spring structure is formed about the hub.

The advantages of this novel wheel construction will be apparent when it is realized that the ends of each spoke member are secured to the rim in such a manner that a movement is permitted between them which is of course more or less diminished by friction between the parts, and the connection at the point of contact with the rim is such as to overcome any tendency for lateral movement. Furthermore the clips which connect the spoke members with the spring arms 23 are so attached that a slight sliding movement is permitted between the parts without causing a displacement of the spring arm 23. The entire spring structure and its adjuncts are so correlated and connected as to form a stiff rigid wheel incapable of lateral flexing through yielding and resilient to radial pressures.

Referring to Fig. 6, a construction is shown wherein the spoke members comprise pairs of arms 28 and 29 each member of which passes around a block 9 of the hub as heretofore described and the ends 30 meet adjacent the rim and overlap, one being within the other and secured to by a rivet 31 at the point of contact as will be apparent. The opposite ends 32 of the pairs of members curve away from each other and terminate in contact with the respective ends 30 as will be apparent, it being noted that the curvature is such as to permit sliding movement between the meeting ends.

It will now be apparent that I have devised a spring wheel construction well adapted for the purpose intended and one in which a plurality of resilient members are so positioned, shaped and arranged as to attain a high degree of flexibility and resiliency and whereby lateral flexing of the parts is impossible and all compression takes place along radial lines.

It will now be apparent that I have devised a novel and useful construction of a resilient wheel which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a spring wheel, a hub, a plurality of spoke members movably connected thereto, a spring arm secured to adjacent spoke members and bearing on said hub, a rim carrying a tire and means for attaching said spoke members to said rim to permit relative movement between said rim and spoke members.

2. In a spring wheel, a hub, a plurality of blocks secured to said hub, a spoke member held by each block and movable with respect thereto, each spoke member comprising a spring band having sides outwardly diverging from the block, spring means carried by said spoke members and bearing on said hub, and a rim carrying a tire, attached to said spoke members.

3. In a spring wheel, a hub, a plurality of blocks carried by said hub and spaced apart, a rim, a plurality of spoke members secured to said rim, and each spoke member comprising a spring band passing around one of said blocks and outwardly diverging therefrom, spring means carried by each spoke member and bearing on said hub, and a tire carried by said rim.

4. In a spring wheel, a hub, a plurality of blocks carried by said hub and spaced apart, a spoke member passing around each block and movable with respect thereto, a rim to which said spoke members are connected, a spring arm between each pair of spoke members and connected thereto, said spring arm having a bearing on said hub.

5. In a spring wheel, a hub, a plurality of blocks carried thereby and having a curved face, a spoke member engaging each block and having a portion thereof conforming to said curved face, a rim to which said spoke members are connected to permit relative movement therebetween, and spring means extending between and connected with adjacent spoke members and bearing on said hub, and a tire carried by said rim.

6. In a spring wheel, a hub, a rim, a plurality of spoke members movably connected thereto, each spoke member comprising a spring band having sides outwardly diverging from said hub, one of said sides terminating in a curve contacting with said rim, and the other side terminating in a curve contacting with the face of said first mentioned side, and spring means between said spoke members and said hub.

7. In a spring wheel, a hub, a rim, a plurality of spoke members movably connected thereto, each spoke member comprising a spring band having sides outwardly diverging from said hub, one of said sides terminating in a curve contacting with said rim, and the other side terminating in a curve contacting with the face of the said first mentioned side, a spring arm secured to each pair of spoke members and contacting with said hub.

8. In a spring wheel, a hub, a rim, a plurality of spoke members movably connected thereto, each spoke member comprising a spring band having sides outwardly diverging from said hub, one of said sides terminating in a curve contacting with said rim, and the other side terminating in a curve contacting with the face of said first mentioned side, a spring arm between each pair of spoke members having a curved end contacting with said hub.

9. In a spring wheel, a hub, a rim, a plurality of spoke members movably connected thereto, each spoke member comprising a spring band having sides outwardly diverging from said hub, one of said sides terminating in a curve contacting with said rim, and the other side terminating in a curve contacting with the face of said first mentioned side, a spring arm between each pair of spoke members having a curved end contacting with said hub, and a plurality of blocks secured to said hub and adapted to secure said spoke members to said hub.

10. In a spring wheel, a hub, a rim carrying a tire, a plurality of pairs of spoke members movably connected to said hub, and having curved ends oppositely disposed with respect to each other, means to connect each spoke member to said rim, and spring means between each pair of spoke members terminating in a curved end resting upon said hub.

11. In a spring wheel, a rim, a hub, spring members connected with said hub, the ends of each member extending in opposite directions and overlapping each other, one of said ends extending to an adjacent spring member, means for connecting said ends with said rim, a spring arm having a portion thereof between adjacent spring members and another portion engaging said hub, and means for connecting said spring arm with the sides of said adjacent spring members.

12. In a spring wheel, a rim, a hub, spring members connected with said hub, the ends of each member extending in opposite directions and overlapping each other, one of said ends extending to an adjacent spring member, means for connecting said ends with said rim to permit movement therebetween, a spring arm having a portion thereof between adjacent spring members and another portion engaging said hub, and means for connecting said spring arm with the sides of said adjacent spring members.

13. In a spring wheel, a hub, a rim, a plurality of spoke members, each spoke member comprising a spring band having sides outwardly diverging from said hub, one of said sides terminating in a curved portion contacting with said rim and the other side terminating in a curved portion adjacent said first mentioned side, and means secured to said rim to prevent displacement of said curved portions and permitting relative movement between the latter and said rim.

14. In a spring wheel, a hub, a rim, a plurality of spoke members, each spoke member comprising a spring band having sides outwardly diverging from said hub, one of said sides terminating in a curved portion contacting with said rim and the other side terminating in a curved portion, said portions being adapted to receive an end of the next adjacent spoke member therebetween, and means secured to said rim to prevent displacement of said spoke members.

CHARLES L. SCHWARZ.

Witnesses:
C. D. McVay,
F. A. Newton.

---

Copies of this patent may be obtained for five cents each, by addressing the "Commissioner of Patents, Washington, D. C."